(12) United States Patent
Lu et al.

(10) Patent No.: US 7,515,533 B2
(45) Date of Patent: Apr. 7, 2009

(54) TWO-SLOT DYNAMIC LENGTH WFQ CALENDAR

(75) Inventors: Jordan Lu, Kanata (CA); Robert Elliott Robotham, Ottawa (CA)

(73) Assignee: Alcatel Lucent, Paris (FR)

( * ) Notice: Subject to any disclaimer, the term of this patent is extended or adjusted under 35 U.S.C. 154(b) by 859 days.

(21) Appl. No.: 11/006,557

(22) Filed: Dec. 8, 2004

(65) Prior Publication Data

US 2006/0120380 A1 Jun. 8, 2006

(51) Int. Cl.
*H04L 1/00* (2006.01)
(52) U.S. Cl. .................................. 370/229; 370/230
(58) Field of Classification Search .................. None
See application file for complete search history.

(56) References Cited

U.S. PATENT DOCUMENTS

| | | | | |
|---|---|---|---|---|
| 6,952,424 B1* | 10/2005 | Bass et al. | .................. | 370/412 |
| 2002/0023168 A1* | 2/2002 | Bass et al. | .................. | 709/232 |
| 2003/0154328 A1* | 8/2003 | Henderson et al. | .................. | 710/1 |
| 2003/0182352 A1 | 9/2003 | Olesinski | | |
| 2004/0160961 A1* | 8/2004 | Duckering et al. | ........ | 370/395.4 |
| 2004/0258072 A1* | 12/2004 | Deforche | .................. | 370/395.4 |
| 2005/0177644 A1* | 8/2005 | Basso et al. | .................. | 709/232 |
| 2007/0091797 A1* | 4/2007 | Ma et al. | .................... | 370/229 |

OTHER PUBLICATIONS

Tan, et al; "Snoopy Calendar Queue"; Dec. 2000, Proceedings of the 2000 Winter Simulation Conference; vol. 1, pp. 487-495.*
Stoica, et al; "Earliest Eligible Virtual Deadline First : A Flexible and Accurate Mechanism for Proportional Share Resource Allocation"; Jan. 1996; Technical Report TR-95-22; Department of Computer Science, Old Dominion University, pp. 1-37.*
Rexford, Jennifer, et al, Hardware-Efficient Fair Queueing Architectures for High-Speed Networks, Mar. 1996.

* cited by examiner

*Primary Examiner*—Wing F Chan
*Assistant Examiner*—Robert C Scheibel

(57) ABSTRACT

A system and method of scheduling and servicing events in a communications network are described. To provide improved efficiency while maintaining fairness to all traffic a two slot dynamic length Weighted Fair Queuing (WFQ) calendar is implemented. The two slot calendar can be transformed to provide fine granularity utilizing a hierarchical WFQ scheme.

20 Claims, 2 Drawing Sheets

TWO-SLOT DYNAMIC LENGTH WFQ CALENDAR

FIELD OF THE INVENTION

This invention relates to the communication of information and more particularly to scheduling and servicing of high speed data traffic.

BACKGROUND OF THE INVENTION

Information, including data information, is conveniently communicated over communication channels. These channels may include one or more paths between entities allowing communication of information through one or more types of communication media, for example: wire line, fibre optic cables and wireless connections. Typically, a communication channel has a finite bandwidth, i.e., only a finite amount of information may be communicated through the channel in a given amount of time. Information from several sources may be communicated over a common communication channel by sequencing the information over time.

Different types of information may be subject to different communication requirements. Examples of such requirements include a minimum amount of bandwidth, a maximum amount of permissible delay, and a maximum permissible portion of the information that is not successfully communicated. For example, a teleconferencing application may require communication of information at high bandwidth and with very little delay but may not be seriously degraded if a portion of the information is lost during transmission. Another application, for example an interactive web browsing application, may tolerate greater delay but with little or no tolerance for lost information. As another example, file transfer application may tolerate substantial delay but require complete reliability of the information communicated. Thus, it is desirable to provide communication in a manner that accommodates the various communication requirements of various types of information. It is also useful to be able to fairly allocate communication resources among types of information having similar communication requirements.

Attempts have been made to use calendar structures for the allocation of information to communication channels. However, such calendar structures have generally required storing and processing large amounts of overhead information to control the communication of information through a communication channel. Such requirements have placed limits on the operating speed of the system used to allocate information to the channel. Thus, scheduling and servicing techniques that avoid these disadvantages are desired.

A typical prior art scheduler architectures is a traditional n-slot weighted fair queuing (WFQ) calendar which may contain hundreds of calendar slots in order to meet the diversified bandwidth requirements and variable packet sizes. In view of this, a large amount of memory is required for implementation and this large memory requirement leads to latency issues.

U.S. patent application Ser. No. 10/334,204 filed Dec. 30, 2002 to Olesinski et al., describes one prior art calendar structure. In the Ser. No. 10/334,204 application entitled "Methods and Apparatus for Scheduling and Servicing Events Using a Calendar Structure" a multi-tier structure is presented which means that it consumes less memory than a typical n-slot WFQ calendar. Although it does not require hundreds of calendar slots as in the n-slot WFQ calendar it still requires tens of calendar slots which as indicated previously raises latency issues. The contents of application Ser. No. 10/334,204 are incorporated herein by reference.

One additional problem that exists with both n-slot WFQ calendars and the architecture disclosed in the aforementioned application is that the number of calendar slots in a calendar is fixed. This means that even if some calendar slots are never used the memory used for implementing them is reserved.

In a typical WFQ calendar architecture each calendar slot has to store both head and tail pointers. The more slots required, the more memory is used to store these head and tail pointers. This is a particular issue because internal memory is often used in the implementation to minimize latency. This need to use internal memory is significant for WFQ schedulers that may be implemented in the datapath. For example, a traffic management chip designed in Alcatel supports 3.5 k WFQ calendars and consumes around 4 M bits internal memory. It was desired that further 2 k WFQ calendars be implemented on the chip but this is not feasible due to the large amount of internal memory consumption.

The present invention addresses the aforementioned problems by using resources in a very efficient way while maintaining good performance. Fairness of scheduling and service is provided by using a two-slot dynamic length WFQ calendar. The calendar can be configured to provide a fine granularity by using a hierarchical WFQ scheme.

SUMMARY OF THE INVENTION

Therefore, in accordance with a first embodiment of the invention there is provided a method of scheduling events in a communication system, the method comprising configuring a scheduling calendar with multiple slots wherein the length of each slot is varied dynamically based on a virtual theoretical emission time (VTET) of queues scheduled thereon.

In accordance with a second aspect of the invention there is provided a system for scheduling events in a communications system, the system comprising a scheduling calendar having multiple slots wherein the length of each slot is dynamically variable, the length being based on a virtual theoretical emission time (VTET) of queues scheduled thereon.

BRIEF DESCRIPTION OF THE DRAWINGS

The invention will now be described in greater detail with reference to the attached drawings wherein.

DETAILED DESCRIPTION OF THE INVENTION

Figure 1:
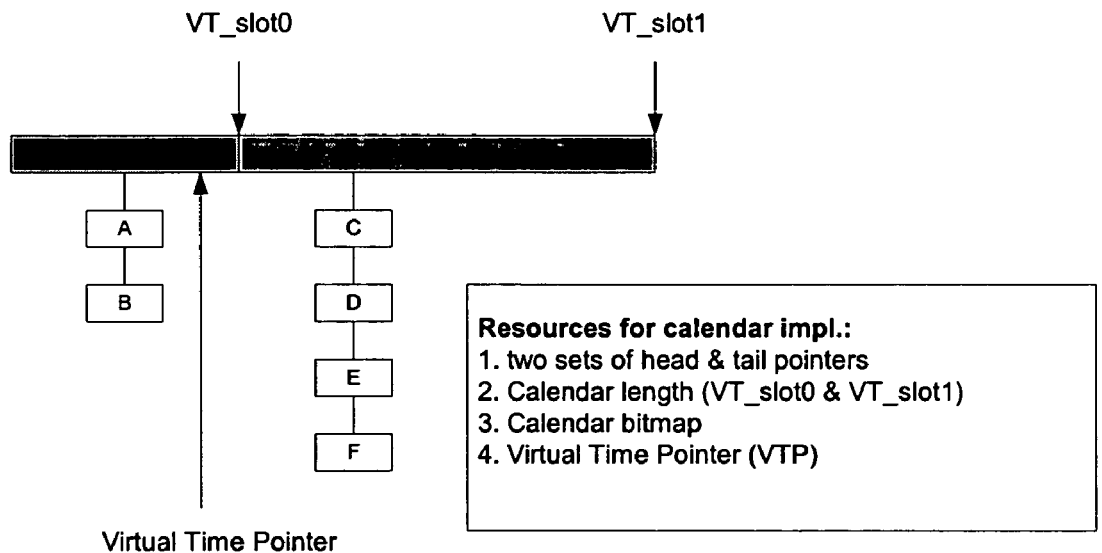
FIG. 1 Illustrates a two-slot dynamic length WFQ calendar.

As shown in FIG. 1, the 2-slot dynamic length WFQ calendar consists of 2 slots, but the length of each calendar slot can be changed dynamically based on the maximum virtual theoretical emission time (i.e. vtet) of the queues scheduled on the calendar slot. In FIG. 1, the length of slot 0 (VT_slot0) is equal to the maximum length of VtetA and VtetB and the length of slot 1 (VT_slot1) is equal to the maximum length of VtetC, VtetD, VtetE and VtetF.

The concept of the VTET is expressed by the following pseudo code for illustration purposes:

Vtet X: virtual theoretical emission time for queue X;
VTP: Virtual Time Pointer and it represents the system virtual time in the WFQ algorithm;

VweightPeriod X: the reciprocal value of weight for queue X.

scheduling packet size: the length of the scheduling packet.

If queue X is empty then $Vtet\ X = VTP + VweightPeriod\ X * scheduling\ packet\ size$;

Else $Vtet\ X = Vtet\ X\_previous + VweightPeriod\ X * scheduling\ packet\ size$ End if The scheduling and servicing methods of the two-slot dynamic length WFQ calendar are the same as traditional n-slot WFQ calendar. During the scheduling event, the scheduling queue is located on the calendar slot which represents the range of the Vtet of the scheduling queue. During the servicing event, the Virtual Time Pointer (VTP) will advance to the nearest occupied slot and the head queue in the nearest occupied slot is granted.

The following simple example illustrates how this works:

Queue X and queue Y are scheduled on the calendar and VweightPeriods for queue X and Y are 1 and 2 respectively. The packets in the queue X and Y are all 100 byte packets and both queues will not be empty.

Initially, VT_slot0=100 and VT_slot1=200 and no queues are scheduled on it. Queue X is first scheduled on the slot 0 because its Vtet=100; then queue Y is scheduled on the slot 1 because its Vtet=200. No adjustments are required for both VT_slot0 and VT_slot1.

(1) At the first service event, the queue X is granted, its Vtet=200 after the reschedule and it is put on the slot 1 again and no adjustment is required for VT_slot1;

(2) At the second service event, the queue Y is granted, its Vtet=400 after the reschedule and it is put on the slot 0 and the VT_slot0 is adjusted to 400.

The sequence of the service events and corresponding data is listed in Table 1 and it is easy to see that it achieves the expected fairness (i.e., queue X serviced 2 times faster than queue Y).

the hierarchical scheme refer to a paper by Rexford et al., entitled "Hardware-Efficient Fair Queuing Architectures for High-Speed Networks, Proc. IEEE INFOCOM, March 1996, pp. 638-646.

Memory is saved by the two-slot dynamic length WFQ calendar implementation in comparison to other WFQ calendar implementations while the same fairness is achieved. This also means that a given implementation of a TM device, eg an ASIC, can support more WFQ schedulers or that the WFQ schedulers will require fewer resources to implement.

With an implementation such as an ASIC chip which have many such two-slot WFQ calendars, it is easy to make it support thousands of coarse granularity WFQ schedulers, or make it support hundreds of fine granularity WFQ schedulers, or make it support some fine granularity WFQ schedulers and some coarse granularity WFQ schedulers.

This is a very useful feature For example, the fine granularity WFQ schedulers can be used for real time traffic, while the coarse WFQ schedulers can be used for best effort traffic. Alternatively, the granularity of a WFQ calendar may be determined dynamically based on the number of queues that are scheduled on it.

One of the hardest parts of WFQ calendar implementation is the selection of the servicing calendar slot. With such a two-slot WFQ calendar, the selection of the servicing calendar slot is very simple, so it is much easier to implement, as is the high speed scheduler.

While particular embodiments of the invention have been described and illustrated it will be apparent to one skilled in the art that numerous changes can be made without departing from the basic concepts. It is to be understood that such changes will fall within the said scope of the invention as defined in the appended claims.

The invention claimed is:

1. A method of scheduling events in a communications system having at least one traffic management device, the method comprising:

TABLE 1

| | Service sequence | | | | | | | | | |
|---|---|---|---|---|---|---|---|---|---|---|
| | Initial | 1 | 2 | 3 | 4 | 5 | 6 | 7 | 8 | 9 |
| granting queue | | X | Y | X | Y | X | X | Y | X | X |
| Vtet X | 100 | 200 | 200 | 300 | 300 | 400 | 500 | 500 | 600 | 700 |
| Vtet Y | 200 | 200 | 400 | 400 | 600 | 600 | 600 | 800 | 800 | 800 |
| VT_slot0 | 100 | 100 | 400 | 400 | 400 | 400 | 400 | 800 | 800 | 800 |
| VT_slot1 | 200 | 200 | 200 | 200 | 600 | 600 | 600 | 600 | 600 | 600 |

| | Service sequence | | | | | | | | | |
|---|---|---|---|---|---|---|---|---|---|---|
| | 10 | 11 | 12 | 13 | 14 | 15 | 16 | 17 | 18 | 19 |
| Granting queue | Y | X | X | Y | X | X | Y | X | X | Y |
| Vtet X | 700 | 800 | 900 | 900 | 1000 | 1100 | 1100 | 1200 | 1300 | 1300 |
| Vtet Y | 1000 | 1000 | 1000 | 1200 | 1200 | 1200 | 1400 | 1400 | 1400 | 1600 |
| VT_slot0 | 800 | 800 | 800 | 1200 | 1200 | 1200 | 1200 | 1200 | 1200 | 1600 |
| VT_slot1 | 1000 | 1000 | 1000 | 1000 | 1000 | 1000 | 1400 | 1400 | 1400 | 1400 |

Figure 2:
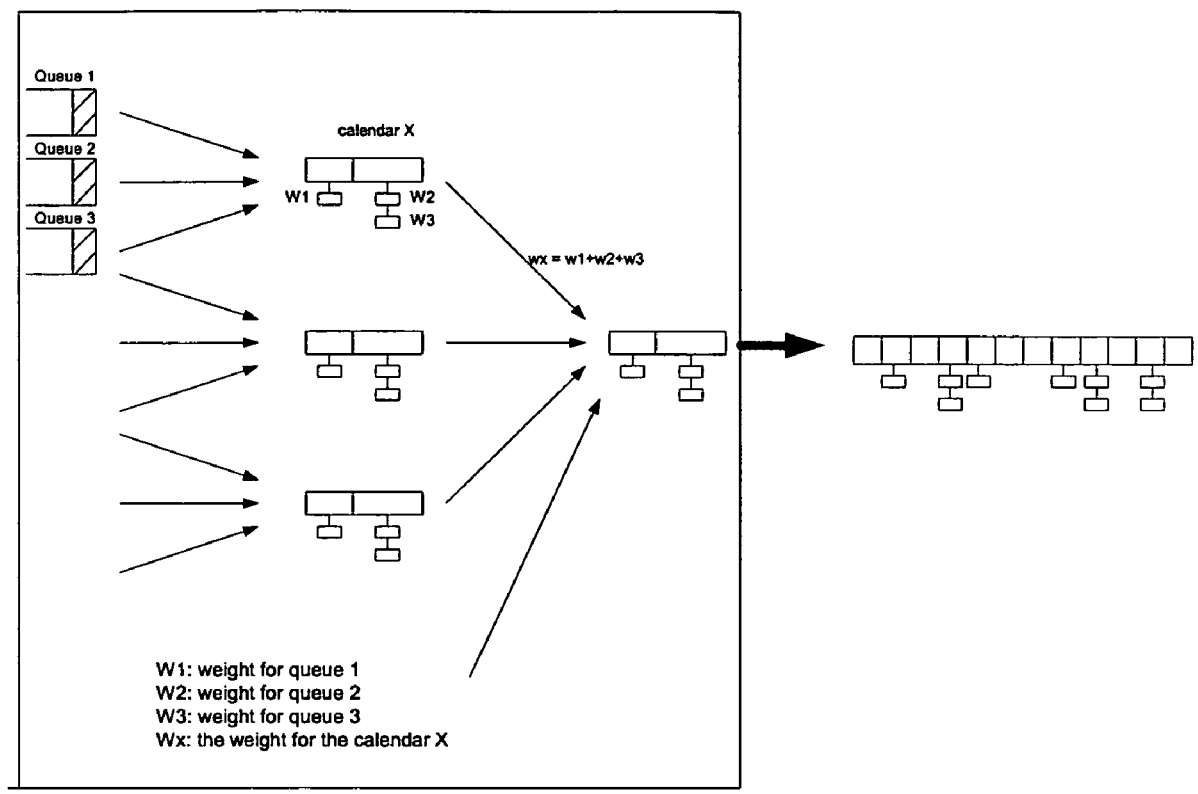
FIG. 2 Illustrates the forming of a high precision WFQ calendar through a number of two slot dynamic length calendars.

As shown in FIG. 2, it is possible to increase the granularity and precision of the WFQ calendar by using a number of 2-slot dynamic length WFQ calendars based on a hierarchical scheme. In FIG. 2, the weight for queues 1, 2, and 3 are w1, w2, and w3, respectively. The weight for the calendar X (wx) is equal to the sum of the weights of all the queues which are scheduled on the calendar X. For a greater understanding of maintaining, at the traffic management device, at least one scheduling calendar having a static number of slots for scheduling events, wherein each slot has a virtual time range associated therewith;

determining, for each event to be scheduled, a virtual theoretical emission time (VTET);

selecting, for each event to be scheduled, an appropriate slot for the event to be queued on, the selection based at least in part upon the virtual time range of the slot and the VTET of the event to be scheduled; and varying the virtual time range of each slot dynamically based solely on a maximum VTET of the events scheduled thereon.

2. The method as defined in claim 1 wherein the calendar is a Weighted Fair Queuing (WFQ) calendar.

3. The method as defined in claim 1 wherein the calendar has two slots.

4. The method as defined in claim 1 wherein the virtual time range for each slot is set equal to the maximum VTET of the queues scheduled thereon.

5. The method as defined in claim 1 wherein the slot to be selected for each event to be scheduled is the slot that represents a virtual time range which encompasses the VTET of the event to be scheduled.

6. The method as defined in claim 1 wherein, during a servicing event, a virtual time pointer (VTP) representing a system virtual time advances to the nearest occupied slot and the head queue therein is serviced.

7. The method as defined in claim 2 wherein all of the slots have the same granularity.

8. The method as defined in claim 2 wherein at least two of the slots have differing granularities.

9. The method as defined in claim 8 wherein the slots having differing granularities are used for different scheduling implementations.

10. The method as defined in claim 8 wherein the slot having the finer granularity of the at least two slots is used for scheduling real time traffic and the slot having the coarser granularity of the at least two slots is used for servicing best effort traffic.

11. The method as defined in claim 8 wherein the granularity of the calendar is determined dynamically based on the number of events scheduled thereon.

12. A system for scheduling events in a communications system, the system comprising:

at least one scheduling calendar having a static number slots for scheduling events, wherein each slot has a dynamically variable virtual time range associated therewith, the virtual time range being based solely on a maximum virtual theoretical emission time (VTET) of the events scheduled thereon; and a scheduler operative to determine, for each event to be scheduled, a VTET, and further operative to select, for each event to be scheduled, an appropriate slot for the event to be queued on, the selection based at least in part upon the virtual time range of the slot and the VTET of the event.

13. The system as defined in claim 12 wherein the calendar is a Weighted Fair Queuing (WFQ) calendar.

14. The system as defined in claim 12 wherein the calendar has two slots.

15. The system as defined in claim 12 wherein the virtual time range of each slot is set equal to the maximum VTET of the events scheduled thereon.

16. The system as defined in claim 13 wherein all of the slots have the same granularity.

17. The system as defined in claim 13 wherein at least two of the slots have differing granularities.

18. The system as defined in claim 17 wherein the slots having differing granularities are used for different scheduling implementations.

19. A method of scheduling events in a communications system having at least one traffic management device, the method comprising:

maintaining, at the traffic management device, at least one scheduling calendar having, at all times, two slots for scheduling events, wherein both slots have a virtual time range associated therewith;

determining, for each event to be scheduled, a virtual theoretical emission time (VTET), wherein the VTET is based upon a length of the event to be scheduled multiplied by a reciprocal value of weight for the event;

selecting, for each event to be scheduled, an appropriate slot for the event to be queued on, wherein a slot having a virtual time range that encompasses the VTET event to be scheduled is the slot that is selected; and varying the virtual time range of each slot dynamically by setting the time range equal to a maximum VTET of the events scheduled thereon.

20. The method of claim 19, wherein the reciprocal value of weight for real time traffic is a lower number than the reciprocal value of weight for best effort traffic.

* * * * *